March 10, 1970  O. R. ARMSTRONG ET AL  3,499,513
CHANGE-MAKING APPARATUS
Filed May 7, 1968  3 Sheets-Sheet 1
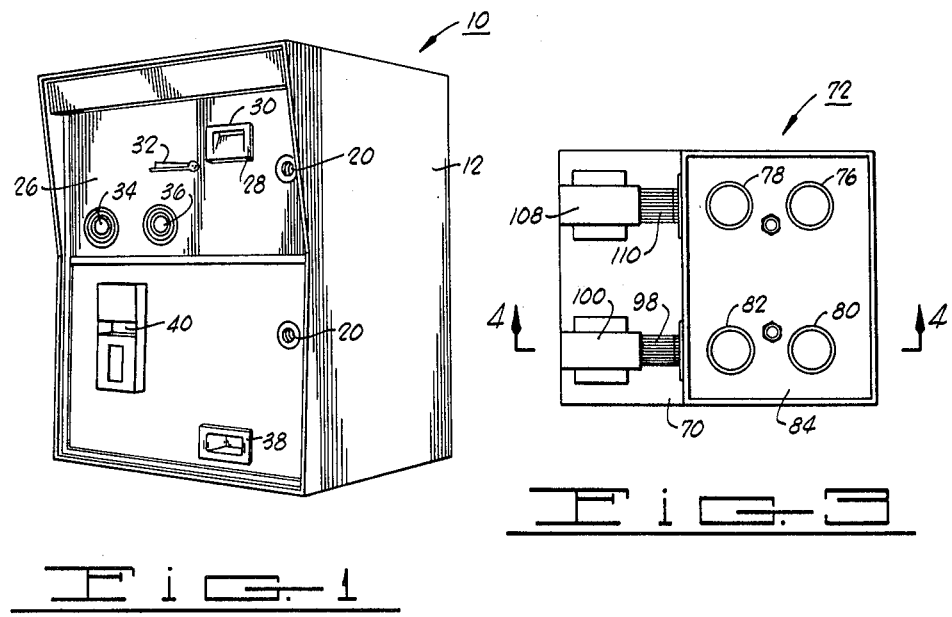
Fig.1
Fig.3
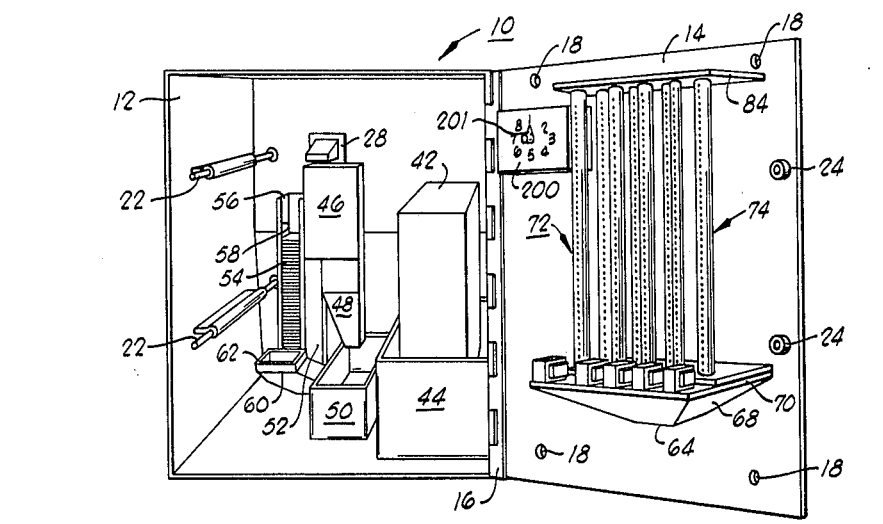
Fig.2
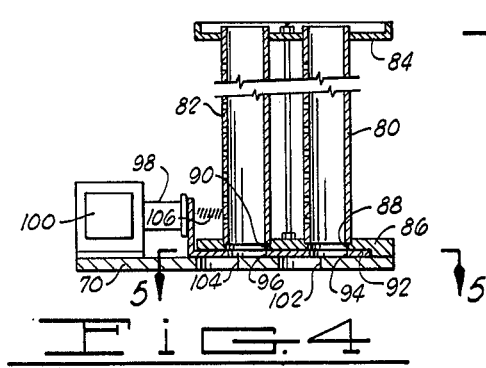
Fig.4
INVENTORS.
BILLY J. EARLY
OLEN R. ARMSTRONG,
DONALD W. MATLOCK,
JAY W. McWATERS &
BY CHARLES E. PRUITT
ATTORNEYS

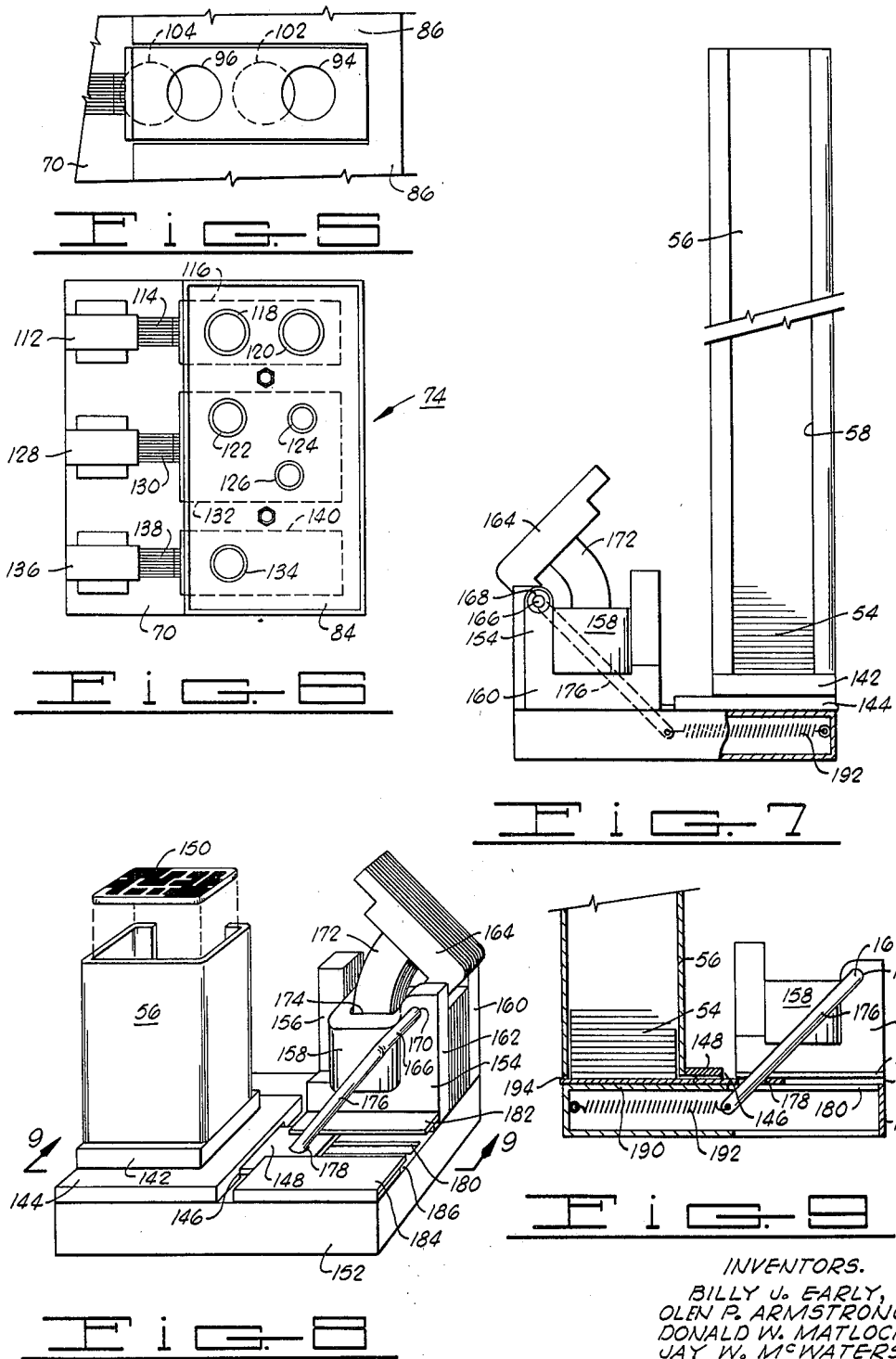

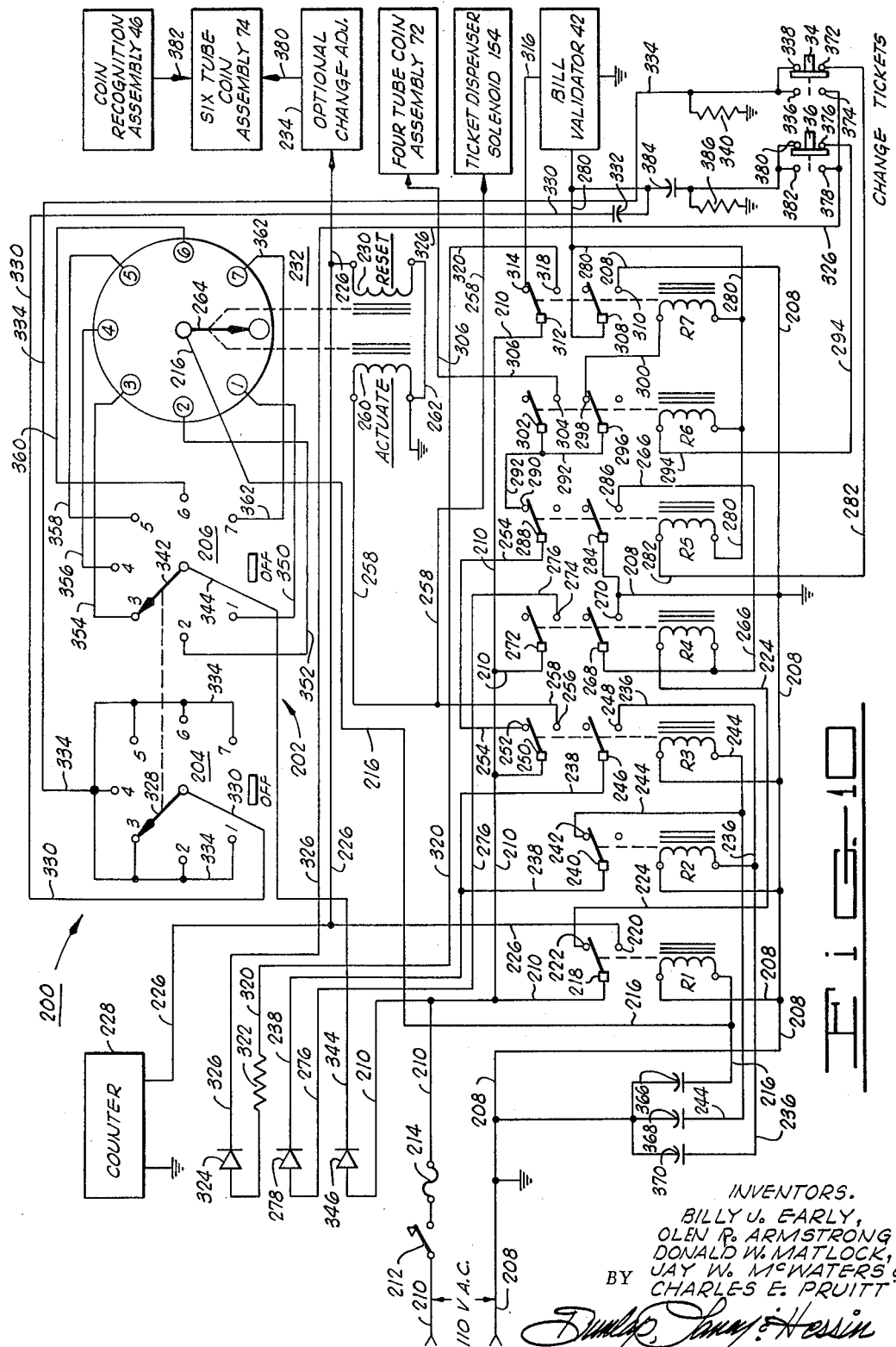

United States Patent Office 3,499,513
Patented Mar. 10, 1970

3,499,513
CHANGE-MAKING APPARATUS
Olen R. Armstrong, Oklahoma City, Billy J. Early, Del City, Donald W. Matlock, Oklahoma City, Jay W. McWaters, Bethany, and Charles E. Pruitt, Oklahoma City, Okla., assignors to Pyramid Manufacturing, Inc., Oklahoma City, Okla., a corporation of Oklahoma
Filed May 7, 1968, Ser. No. 727,380
Int. Cl. G07f 1/06
U.S. Cl. 194—4
15 Claims

ABSTRACT OF THE DISCLOSURE

An apparatus for receiving coin or currency and dispensing coin change or tickets which consists of a security frame member housing ticket dispensing and coin change dispensing assemblies, the apparatus includes a coin changing mechanism and a bill validating mechanism for receiving coin or currency input to thereafter energize either or both of the coin change and ticket dispensing assemblies in accordance with a preset value adjustment.

BACKGROUND OF THE INVENTION

Field of the invention

The invention relates generally to money changing apparatus and, more particularly, but not by way of limitation, it relates to improved change-making apparatus for use in dispensing money change, tickets or both change and tickets.

Description of the prior art

The prior art includes various types of money changing apparatus which is capable of receiving either coin or currency input to dispense predetermined amounts of money change. Former teachings also include coin or money operated ticket dispensing apparatus which might employ various types of coin or money recognition equipment for the purpose of setting in motion a ticket or check dispensing assembly. Such prior ticket dispensing apparatus has usually taken the form of reel-type ticket storage and these have included little or no provision for ready adjustment of ticket value relative to coin or currency input, or to the dispensing of bulk stored check pieces other than reel-stored tickets.

SUMMARY OF THE INVENTION

The present invention contemplates change-making apparatus wherein money input is evaluated thereafter to enable selection of coin change in selected form or, alternatively, a predetermined number of tickets. In a more limited aspect, the invention consists of a frame assembly having a plurality of front access openings and including there within a storage assembly for holding a plurality of tickets, an actuation assembly for moving a ticket through one of the access openings upon energization, a bill validating assembly and a coin recognition assembly, and control means responsive to the bill validation or coin recognition to enable output of either a ticket or an amount of coin change through one of the access openings. The apparatus further includes provision for the dispensing of a particular type of ticket, a rigid check piece, which is employed for automatic machine operation.

Therefore, it is an object of the present invention to provide a change-making apparatus which receives either coin or currency input to enable the dispensing of selected change denominations, tickets, or both tickets and remaining change.

It is also an object of the invention to provide apparatus which is readily adjustable as to the number of tickets dispensed upon input of a predetermined amount in coin or currency.

It is a further object of the invention to provide such a change-making machine which may be mounted in relatively pirate-free disposition with allowance of only limited pry leverage or other tampering access at the cover hinge of the machine.

It is a still further object of the present invention to provide a coin or currency operated machine for dispensing actuation checks for use in automatic washing and drying machines.

Finally, it is an object of the present invention to provide such coin or currency operated machine for use in washateria or such other installations to provide various desirable combinations of coin change as well as machine actuation checks or combinations of both.

Other objects and advantages of the invention will be evident from the following detailed description when read in conjunction with the accompanying drawings which illustrate the invention.

BRIEF DESCRIPTION OF THE DRAWING

FIG. 1 is a perspective view of a change-making machine constructed in accordance with the invention;

FIG. 2 is a perspective view of the machine of FIG. 1 when in its opened disposition;

FIG. 3 is a top plan view of a four tube coin dispensing assembly utilized in the FIG. 1 machine;

FIG. 4 is a vertical section through lines 4—4 of the coin assembly of FIG. 3;

FIG. 5 is a section through lines 5—5 of the coin assembly section of FIG. 4;

FIG. 6 is a top plan view of a six tube coin assembly as employed in the change-making machine of FIG. 1;

FIG. 7 is a side elevation with parts shown cut away of a ticket dispensing assembly as utilized in the machine of FIG. 1;

FIG. 8 is a perspective view of a lower portion of the ticket dispensing assembly of FIG. 7;

FIG. 9 is a vertical section taken along lines 9—9 of FIG. 8; and

FIG. 10 is a schematic diagram of the control circuitry as employed in the change-making apparatus.

DESCRIPTION OF THE PREFERRED EMBODIMENT

As shown in FIGS. 1 and 2, the change-making apparatus 10 consists of a generally box-shaped frame 12 having a rear-side access door 14 affixed by means of hinge 16 extending vertically along the whole height of frame 12. The frame 12 may be formed through all-welded construction from heavy steel plating such that pirating by cutting through frame 12 would present great difficulty. In addition, the apparatus 10 utilizes a rear-disposed hinge 16 which tends to lessen greatly the possibility of prying open. Thus, the apparatus 10 can be secured to a mounting wall or such through rear panel 14 by means of mounting holes 18 such that hinge 16 will also be flush to or quite close to the mounting wall (not shown). Operators access is then available through front panel locks 20 to swing the entire frame 12 out from mounted rear panel 14 to allow coin or ticket replenishment, repair or whatever. The front panel lock 28 may be such as the very rugged cylinder type of drill proof lock which controls locking of crank bolts 22 within their respective lock rings 24.

A front panel 26 of frame 12 includes a coin insert frame 28 with a slot 30 formed therethrough for receiving various denominations of coin money. Coin return operation of conventional type may be effected by means of a crank 32. Change selection is effected by means a "tickets" push button switch 34 or a "change" push button switch 36 and both forms of article are dispensed through a tray 38 at the bottom of front panel 26. Currency or bill money is inserted in a front panel opening 40 whereupon it too serves to enable certain change or ticket dispensing operation as will be further described below.

As shown in FIG. 2, the interior of frame 12 includes a bill validator assembly 42 which actually provides the front panel access 40. The bill validator 42 may be a commercially available device. For example, one form of bill validator which has been found suitable for use in the present invention is the particular subject matter of a U.S. patent application Ser. No. 658,079 entitled "Bill Validating Apparatus," filed on Aug. 3, 1967 in the name of F. E. Townsend. Such a bill validator 42 receives an input bill through access opening 40 and, after proper validation, the bill is ejected into a currency receptacle 44. In most cases, in the event of a bill not susceptible to validation, the validating assembly 42 merely reverses the bill back out through access opening 40. Coin input through frame 28 places each coin into a conventional type of coin recognition assembly 46. Such recognition assemblies are well-known and commercially available for use in various forms of coin-operated dispensing equipments; one form being obtainable from Coin Acceptor, Inc. of St. Louis, Mo. Thus, the coin recognition assembly 46 includes a first chute 48 which guides accepted coin monies into a coin receptacle 50 while a second chute 52 provides coin return as it leads to discharge tray 38.

Ticket dispensing is also effected through discharge tray 38. A ticket supply 54 is stored in stacked relationship within storage column 56. The storage column 56 is formed to have a cross sectional area which is similar in shape and slightly larger than the shape of one of the tickets 54, and the rear side of storage column 56 is formed with a vertical opening 58 to allow the operator's access to replenish the ticket supply. The storage chute 56 leads downward to a position adjacent the interior side of discharge tray 38 whereupon an actuation assembly (to be described) provides periodic ejection of tickets through discharge tray 38. Still another chute 60 is positioned to direct coin into the front discharge tray 38. When frame 12 and back panel 14 are in the closed position, the upper, square opening 62 of chute 60 lines up beneath a similarly shaped opening 64 at the lower end of a coin chute 68. The coin chute 68 is mounted beneath a support panel 70 which supports a four tube coin assembly 72 and a six tube coin assembly 74, each of which will be further described below.

As shown in FIG. 3, the four tube coin assembly 72 is utilized to dispense quarters through either two or four of the four coin tubes 76, 78, 80 and 82. Thus and referring also to FIGS. 4 and 5, each of coin tubes 76–82 is supported between an upper tray 84 and a gate plate 86 which is rigidly secured with suitable spaced channels to the support panel 70. The gate plate 86 is formed with a pair of holes 88 and 90 in alignment with the respective lower ends of tubes 80 and 82 and slide gate 92 having aligned holes 94 and 96 as disposed in sliding relationship therebeneath. The slide gate 92 is movable in response to retraction of armature 98 of a solenoid 100 such that coins situated within slide gate holes 94 and 96 are moved to a pair of discharge holes 102 and 104 in support plate 70 to be dropped through chutes 68 and 60 to the discharge tray 38. The slide gate 92 is retracted to its normal position by means of a tension spring 106 after release of solenoid 100. Coins within tubes 76 and 78 (FIG. 3) are similarly dispensed by actuation of a solenoid 108 as it withdraws armature 110.

FIG. 6 is a top view of the six tube coin assembly 74, a multi-denomination discharge assembly. Thus, a solenoid 112 and armature 114 control a slide gate 116 to dispense coins from a pair of coin tubes 118 and 120 which are secured vertically between support plate 70 and upper panel 84. Similarly, coin tubes 122, 124 and 126 are controlled by a solenoid 128 as it withdraws an armature 130 and slide gate 132; and a coin tube 134 is controlled by a solenoid 136, armature 138 and slide gate 140. While the denominations of the various coin tubes are subject to any of several change dispensing schemes, it is presently planned that coin tubes 76, 78, 80 and 82 are quarter tubes for the purpose of giving two quarter or four quarter change for halves and dollar bills. The coin tubes 118 and 120 are also quarter tubes while tubes 124, 126 and 122 dispense two dimes and a nickel for a quarter input or as required for higher denomination combinations, and coin tube 134 is a nickel tube which may be programmed to dispense two nickels per dime input. With this apparatus it is possible to dispense any combination of coin change and/or tickets for a given coin or currency input as will be further described below.

Referring now to FIGS. 7, 8 and 9, the ticket storage column 56 is formed with a securing flange 142 about its lower perimeter and this in turn is secured to a gate plate 144. The gate plate 144 provides a channel or slide way 146 through which a slide gate 148 is reciprocated to effect periodic ejection of one of tickets 150. The tickets 150 are a particular type of automatic machine check actuator such as, for example, a coded magneto-optic check as employed by the Maytag Corporation for acuating automatic washing machines, dryers, and related equipment. Such checks are formed as a relatively thin rectangle of rigid, translucent plastic which bears opaque code markings thereon. Such opaque code markings can be placed on each side of the check to provide predetermined light shadowing. There are various other means of providing a coded check for such use and it is submitted that any of these various invisible code deferentiating measures may be employed with the checks dispensed by the present invention.

A base plate 152 provides a planar footing for ticket storage column 56 and gate plate 144 as well as for an actuating solenoid 154. The actuating solenoid 154 consists of an outer laminated core 156 surrounding a solenoid coil 158, the outer frame or core member 156 being secured between a pair of upright supports 160 and 162 which are fastened in parallel relationship to the base plate 152. A second laminated core member, an upper core 164 is rigidly secured to an actuating bar 166 which extends outward on either side and is pivotally held within pivot holes 168 and 170 which extend in aligned relationship through the upper ends of each of the respective right angle braces 160 and 162. The upper core member 164 is formed with a lower extending armature portion 172 which is shaped for reciprocation within a central opening 174 of the coil 158. Thus, coil 158 can be energized to draw armature portion 172 downward therein such that the pivotally mounted top core 164 is brought down into contact with adjoining portions of lower core 156. This action also rotates the shaft 166 to provide ticket dispensing as will be further described below.

The shaft 166 is formed into a right angle bend to extend a portion 176 downward and in loose engagement through a guide hole 178 through the outer end of slide gate 148. An elongated hole 180 is also formed in the top of base plate 152 to provide passage of shaft portion 176 therethrough at all times during rotational movement through its operation. A pair of shoulder plates 182 and 184 are secured to the top of base plate 152 on either side of elongated slot 180 to provide a slideway 186 which guides slide gate 148 on its rearward movement. Thus, energization of solenoid coil 158 draws armature 172 and upper core 164 downward such that lower shaft portion 176 is rotated to assume a vertical disposition and in so doing it draws the slide gate 148 outward from slide opening 146 to allow the next check or ticket to fall downward to rest upon the upper surface portion 190 of base plate 152; thereafter, de-energization of coil 158 allows shaft portion 176 to be returned by means of a tension spring 192 secured beneath base plate 152 and, during this movement, the slide gate 148 pushes the ticket out through a hole or slot 194 and it is then directed to discharge tray 38 (FIG. 1).

The various qualifying and dispensing functions of the change-making apparatus 10 are effected by a control circuit 200, as shown in partially schematic form in FIG. 10. Control circuit 200 includes circuitry which functions to respond to input control signals to control the dispensing of change, tickets or both. The control circuit 200 includes a manually adjustable switch 202, which includes switch sections 204 and 206, and switch 202 serves to enable the operator to select the number of tickets which may be dispensed for a given value of coin or currency input.

A-C line input voltage is applied to leads 208 and 210. The lead 208 is connected as the ground side while lead 210 includes a main power switch 212 and a system fuse 214. A relay R1 is connected for energization between ground lead 208 and a lead 216 to control actuation of a switch contact 218. The switch contact 218 is connected to the A-C hot lead 210 for application between the normally open contact 220 and the normally closed contact 222. The contact 222 provides A-C voltage via lead 224 to relay R4 while the normally open contact 220 and lead 226 provides parallel energization to a counter 228, to a reset coil 230 of a stepping switch 232, and to an optional change adjustment circuit 234 to be further described. The counter 228 may be any conventional form of electrically actuated counter mechanism and the stepping switch 232 may also be a commercially available component, e.g. a stepping relay Model MER–115 sold and distributed by Guardian Electric Company.

Relay R2 receives energization from ground lead 208 and a lead 236 which is energized by a relay R3. Relay R2 controls a D-C voltage available on a lead 238 to switch contact 240 for application via normally closed contact 242 to lead 244. A relay R3 is connected between ground lead 208 and the lead 244 from relay R2. Relay R3 also receives D-C input on leads 238 to switch contact 246 for switching to normally open contact 248 which is connected back to leads 236 and relay R2. A second switch contact 250 of relay R3 is connected to the A-C hot lead 210 to apply A-C voltage to normally closed contact 252 and a lead 254 or, alternatively, to normally open contact 256 and a lead 258. The lead 258 provides periodic actuation to each of an actuate coil 260 of stepping relay 232 and the ticket dispenser solenoid 154 (e.g. FIG. 7). Each of the actuate coil 260 and reset coil 230 of stepping relay 232 are connected to ground via a lead 262. The actuate coil 260 is energized to advance a wiper arm 264 of stepping relay 232 rotationally through a single switch step, i.e. from zero to one, or one to two, etc., and the reset coil 230 is energized to return the wiper arm 234 back to the zero or no connection position.

A relay R4 is connected to be energized by connection between lead 224 (from relay R1) and a lead 266. Relay R4 controls connection of its energizing lead 266 through a switch contact 268 to a normally open contact 270 and ground lead 208. A second switch contact 272 of relay R4 controls application of A-C voltage on A-C lead 210 to a normally open contact 274 and a lead 276 which conducts A-C energizing voltage to a rectifier 278. The D-C output from rectifier 278 is applied via lead 238 for switching at each of the relays R2 and R3. Relay R5 is energized by connection between a lead 280 and a lead 282. A switch contact 284 controls connection of ground lead 208 to a normally open contact 286 and the lead 266 energizing relay R4. A second switch contact 288 applies A-C energy present on lead 254 to normally closed contact 290 and lead 292.

Relay R6 also has one side connected to lead 280 while the other side is connected to a lead 294. Relay R6 controls A-C input on lead 292 through a first switch contact 296 to normally closed contact 298 and a lead 300 and, in parallel, through a second switch contact 302 for application to a normally open switch contact 304 to a lead 306 which is applied for periodic actuation of the four tube coin assembly 72 (FIG. 3).

Relay R7 is connected for energization between lead 280 and lead 300 from relay R6. Relay R7 controls a switch contact 308 which controls connection of a normally open contact 310 and ground lead 208 with lead 280 which is also applied to the bill validator 42 (FIG. 2) wherein it is periodically grounded to initiate actuation of the control circuit 200 as will be further described below. Also, a switch contact 312 (relay R7) is connected to the A-C hot lead to apply A-C voltage through normally closed contact 314 and lead 316 to energize bill validator 42, as well as through normally open contact 318 and a lead 320 for rectification. Thus, the A-C voltage on lead 320 is applied through a current limiting resistor 332 to a rectifier 324 to provide a A-C voltage output on lead 326 for use in change/ticket selection as will be further described below.

The operators adjustment switch 202 in conjuction with stepping relay 232 provide a control adjustment for selecting the number of tickets which may be dispensed for a given input value. Thus, a wiper 328 of switch section 204 is connected to a lead 330 which is led down for connection to a timing capacitor 332 which, in turn, is returned to lead 280 for periodic grounding. Each of the individual contacts 1–7 of switch section 204 are connected via a lead 334 for parallel connection to one side of push button switch 34, i.e. to each of contacts 336 and 338. A resistance 340 is connected between lead 334 and ground to provide a requisite timing function in conjunction with capacitor 332. The second switch section 205 receives D-C voltage input to its wiper 342 via lead 344. The D-C voltage is derived from application of A-C voltage via A-C lead 210 through a rectifier 246 with D-C output present on lead 344. The wiper contact 342 of switch section 206 then applies D-C voltage to one of the respective contacts 1–7 of section 206 for conduction to a respective contact 1–7 of stepping relay 232. Thus, each of the relay contacts 1–7 of switch section 206 is connected through a respective one of leads 350, 352, 354, 358, 360 and 362 to the respective relay contacts 1–7 of stepping relay 232. Actuation of stepping relay 232 through a predetermined number of steps will then provide a selected output via lead 216 for conduction back down to the energizing coil of relay R1.

The energizing coils of respective relays R1, R2 and R3 each have one side connected through respective capacitors 366, 370 and 368. The capacitors 366, 370 and 368 are selected to be of values which provide particular advantageous timing functions with respect to the activation of their respective relays R1, R2, and R3 as will be further described below.

Relay R5, the "tickets" actuation relay, is connected via lead 282 for actuation by push button switch 34 while the relay R6, the "change" actuation relay is connected via lead 294 to push button switch 36. Thus, with respect to ticket actuation, lead 282 is connected to a normal make contact 372 while its paired normal open contact 374 is connected to the D-C supply lead 326 (from rectifier 324). Thus, the push button switch 34 can be depressed to make contacts 374 and 336 to apply D-C voltage from the lead 326 to lead 334 through switch section 204 (wiper 328) for return on lead 330 to build up a voltage across timing capacitor 332. Upon release of push button 34, the voltage on capacitor 332 is still present via leads 330, switch section 204 and lead 334 to push button contact 338 and contact 372 to actuate relay R5.

Change relay R6 is actuated in similar manner. Thus, energizing lead 294 is connected to a normal make push button contact 376 while a paired normal open contact 378 is connected to the D-C voltage supply lead 326. On the other side of push button switch 36, each of the normal make and open contacts 380 and 382 are connected to a timing capacitor 384 with a resistor 386 tied to ground. Thus, depression of push-button switch 36 applies D-C voltage from contact 378 through contact 382 to charge timing capacitor 384 at a predetermined rate, and release of push button switch 36 allows conduction of the accumulated charge on capacitor 384 through contact 380 and normal make contact 376 for application via lead 294 to activate relay R6.

The optional change adjustment 234 merely consists of a connection which can be made to supply energizing potential to the six tube coin assembly 74 (FIG. 2) in the event that a multiple of individual valued tickets does not total an even denomination input. For example, if the price per ticket were thirty cents it would be desirable to dispense three tickets plus a dime in response to acceptance of a valid one dollar bill input. The coin recognition assembly 46 is connected for energization through line 382 to actuate the six tube coin assembly 74. Thus, coin recognition assembly 46 would function in conventional manner to energize one or more of the solenoids 112, 128 and/or 136 (FIG. 6) to dispense a requisite amount of coin change into discharge tray 38 (FIG. 1). It is well understood that various combinations of coin change and/or tickets can be provided by utilizing the basic structure outlined herein.

Operation

As shown in FIG. 2, the change-making apparatus 10 can be opened up with the front compartment of frame 12 swung outward from the rear panel 14 to allow the operators servicing. The operator then has access to all of the various coin tubes of coin tube assembly 72 and 74 and is able to replenish the supply of tickets 54 in the ticket storage column 56. The bill receptacle 44 and change receptacle 50 may also be readily removed and emptied. The operator can rotate knob 201 of the switch 202 of control circuit 200 to select the number of ticket dispensing actuations which may be effected upon enablement by a given money input recognition signal. For example, a one dollar bill properly recognized and received within apparatus 10 will allow dispensing of a predetermined number of tickets with or without complementing change.

A customer may insert different denominations of coin into coin slot 30 whereupon the coin recognition assembly 46 will effect proper dispensing of coin from the six tube coin assembly 74. This is relatively conventional coin change practice. In addition, a dollar bill can be inserted into bill validater input slot 40 and, if a valid bill is indicated, it can then enable either tickets or change in accordance with the customers front panel selections. The customer might select the "change" push-button 36 whereupon control circuit 200 will energize the four tube coin assembly 72 to dispense four quarters therefrom for delivery in discharge tray 38 to the customer. Alternatively, the customer may select "tickets" by depression of push-button 34 to set the ticket dispensing apparatus in motion as will be further described.

For example, in the case where a dollar bill has been validated, the bill validator 42 grounds lead 280 to energize the enabling relay R7 such that change or ticket selection can then be made. When the customer desires a coin change return, the "change" push button 36 is depressed. The push button 36 serves to charge capacitor 384 from D-C supply lead 326 when depressed such that only upon its release will energizing voltage be applied through normal make contacts 380 and 376 via lead 294 to energize the relay R6, the change relay. This type of push button measure constitutes an anti-pirate device which limits change actuation to but a single successful operation. When energized, the relay R6 closes with switch contact 296 opening the application of A-C energizing voltage via leads 292 and 300 to enabling relay R7.

The relay R7 is then de-activated to unground the activating lead 280 to bill validator 42. Also upon closure of relay R6, the switch contact 302 provides A-C voltage via lead 306 to the four tube coin assembly 72 whereupon each of the solenoids 100 and 108 would be energized to actuate the proper quota of quarter coin change. The release of relay R7 also allows switch contact 312 to relax to its normal closed condition where A-C voltage is applied through contact 314 and lead 316 to re-energize the bill validator 42 for the next succeeding sensing operation.

In the event that a customer desires selection of tickets, he makes such selection by depression of "tickets" push button switch 34. The bill validator 42 will have sensed a proper currency input to ground 280 such that enabling relay R7 is activated, holding being effected by relay switch contact 308 which is poled to the normal open contact 308 and ground lead 208. Thereafter, the customer depresses "tickets" push button switch 34 to enable charging of timing capacitor 332 from D-C lead 326 through lead 334 and switch section 204 for return through lead 330. The push button switch 34 can then be released to allow the discharge of voltage from timing capacitor 332 through switch contacts 338 and 372 to lead 282 for energization of the "tickets" relay R5. The relay R5 is energized to conduct ground potential from lead 208 through switch contact 284 and normal open contact 286 for application on lead 266 to energize relay R4. The opposite side of relay R4 is connected to the A-C supply through lead 224 and relay R1 normal closed contact 222. The remaining switch contact 288 of relay R5 opens the A-C application from lead 254 to lead 292, this breaking the supply to enabling relay R7 to allow it to deactivate.

The relay R4, while providing its own holding through switch contact 268 also provides A-C energization through switch contact 272 and normal open contact 274 for conduction via lead 276 to the rectifier 278. This enables a D-C voltage on lead 238 which is applied to the respective switching contacts 240 and 246 of each of relays R2 and R3. The D-C voltage through switch contact 240, contact 242 and lead 244 causes energization of relay R3 with return to ground 308. The activation of relay R3 then provides the D-C voltage through switching contact 246 and lead 236 to energize relay R2 which is also returned to ground lead 208. It can be noted however that each of relays R2 and R3 receive delayed activation due to the timing capacitors 368 and 370 connected to their respective input leads 244 and 236. Thus, the relay R3 is activated and held on for a predetermined time whereupon it is released to break the energizing circuit to relay R2 and relay R2 deactivates after another preset time determined by its timing capacitor 370.

For each energization of relay R3, the second switch contact 250 removes A-C energization from contact 252 and lead 254 while applying it to the normal open contact 256 for application via lead 258 to actuate coil 260 to operate stepping relay 232 through a single step or switching movement of wiper arm 264, as well as to actuate the ticket dispenser solenoid 154 to eject a single ticket into the front panel discharge tray 38.

After relay R3 and ticket dispenser solenoid 154 have been activated a proper number of times, the wiper arm 264 of stepping relay 232 will match at the proper switch number with switch section 206 of selector switch 202 such that a D-C energizing voltage from lead 344 can be conducted for energization of relay R1 to stop payout. As shown in FIG. 10, operator selection has been made for three tickets per value actuation such that stepping relay 232 would be actuated three times to the three (No. 3) position to receive D-C voltage from lead 344, wiper 342 and jumper lead 354 for conduction via lead 216 to energize relay R1. Relay R1 activates to remove the A-C voltage from contact 222 and lead 224 to de-energize the relay R4 while, at the same time, applying A-C voltage through the normally open contact 220 and lead 226. The lead 226 is applied to register a single count in counter 228 and, also, it may be applied over to the optional change adjustment 234 if such complementary change is due.

It should be understood that the control circuit 220 may be used with various types of money accepting and ticket dispensing mechanisms. For example, it is contemplated that control circuit 200 will be especially useful in conjunction with stamp dispensing, rolled ticket dispensing, and various other forms of controlled length or unit dispensing. The device employs various capacitor time delays which may be varied to some degree so long as the necessary anti-pirating delays are retained in the control.

The foregoing discloses a novel change-making apparatus which enables ready selection of either tickets or monetary coin in return for accepted currency input. The apparatus includes switching means whereby the operator may set the price of tickets for any combinations of input value, this also enabling other uses for such as promotional schemes of awarding an extra ticket at certain times. The change-making apparatus is extremely reliable in operation due to particulars of control structure, and it is relatively tamper proof due to characteristics of frame design which tend to lessen the ability to pierce or pry open the apparatus to gain access to its money escrow compartments, ticket/change supply, etc.

Changes may be made in the combination and arrangements of elements as heretofore set forth in the specification and shown in the drawing; it being understood that changes may be made to the embodiments disclosed without departing from the spirit and scope of the invention.

What is claimed is:

1. Change apparatus for receiving coins or currency and dispensing the equivalent value in tickets or coins of different denomination, the apparatus comprising:
   frame means including a plurality of access openings;
   storage means for holding a plurality of said tickets mounted in said frame means proximate an access opening;
   actuation means for energization to move one of said tickets from said storage means to one of said access openings;
   bill validating means disposed in said frame means adjacent another of said access openings to receive currency therethrough and provide a validation output signal upon proper validation; and
   control means receiving said validation output signal and providing plural successive control outputs to said actuation means to effect plural successive energizations of said actuation means,
       said control means including means for adjusting the number of said plural successive control outputs which are provided in response to each validation output signal.

2. Change apparatus as set forth in claim 1 wherein said control means comprises:
   a voltage source;
   input means receiving said validation output signal and providing an enabling output;
   first relay means receiving said enabling output for actuation by a first voltage from said source;
   first switch means which is normally open and operable to apply said first voltage from said source to actuate said first relay means;
   second relay means periodically actuated in response to actuation of said first relay means to provide each one of said plural successive control outputs to said actuating means;
   stepping relay means connected for step actuation by each of said plural successive control outputs to provide a second voltage output from said source after a predetermined number of step actuations to disable said input means and said first and second relay means.

3. Change apparatus as set forth in claim 1 wherein said storage means and actuation means comprise:
   a vertical, tubular column defining a generally rectangular cross sectional area;
   slide gate means which is slidably disposed across the lower end of said storage column and actuatable to slide out from said position to open said lower end;
   gating control means connected to said slide gate means and energizable to move it to said open position; and
   spring means for returning said slide gate means to said position across said rectangular column after the energization of said actuation means to push one of said tickets to one of said access openings.

4. Change apparatus as set forth in claim 3 wherein said gating control means comprises:
   solenoid means mounted in rigid position adjacent the lower end of said tubular column;
   shaft means pivotally affixed to said slide gate; and
   means coupling said solenoid armature movement to said shaft to effect withdrawal of said slide gate out from said disposition across the lower end of said tubular column.

5. Change apparatus as set forth in claim 2 wherein said storage means and actuation means comprises:
   a vertical, tubular column defining a generally rectangular cross sectional area;
   slide gate means which is slidably disposed across the lower end of said storage column and actuatable to slide out from said position to open said lower end;
   gating control means connected to said slide gate means and energizable to move it to said open position; and
   spring means for returning said slide gate means to said position across said rectangular column after the energization of said actuation means to push one of said tickets to one of said access openings.

6. Change apparatus as set forth in claim 5 wherein said gating control means comprises:
   solenoid means mounted in rigid position adjacent the lower end of said tubular column;
   shaft means pivotally affixed to said slide gate; and
   means coupling said solenoid armature movement to said shaft to effect withdrawal of said slide gate out from said disposition across the lower end of said tubular column.

7. Change apparatus as set forth in claim 2 which is further characterized to include:
   third relay means receiving said enabling output for actuation by a third voltage from said source;
   second switch means which is normally open and operable alternately with said first switch means to apply said third voltage from said source to actuate said third relay means;
   dispensing means disposed in said frame means adjacent one of said access openings and actuatable to release a predetermined amount of coin change; and
   contact means closed in response to actuation of said third relay means to actuate said dispensing means.

8. Change apparatus as set forth in claim 5 which is further characterize to include:
   third relay means receiving said enabling output for actuation by a third voltage from said source;
   second switch means which is normally open and operable alternately with said first switch means to apply said third voltage from said source to actuate said third relay means;
   dispensing means disposed in said frame means adjacent one of said access openings and actuatable to release a predetermined amount of coin change; and
   third switch means closed in response to actuation of said third relay means to actuate said dispensing means.

9. Change apparatus as set forth in claim 8 wherein said gating control means comprises:
   solenoid means mounted in rigid position adjacent the lower end of said tubular column;
   shaft means pivotally affixed to said slide gate; and
   means coupling said solenoid armature movement to said shaft to effect withdrawal of said slide gate out from said disposition across the lower end of said tubular column.

10. In change apparatus which includes currency validating means and coin acceptor means which provide output signals upon energization by proper currency or coin input, and including ticket storage and dispensing means and coin storage and dispensing means each selectively operable in response to said currency or coin output signals, control means comprising:
   first relay means actuated closed by said currency or coin output signal;
   second relay means;
   first switch means which is enabled by said first relay means for closure to actuate said second relay means;
   third relay means enabled by actuation of said second relay means to effect a plurality of predetermined successive actuations to provide successive output actuating signals to said ticket dispensing means and coin dispensing means.

11. A control system as set forth in claim 10 wherein said third relay means comprises:
   third relay means actuated upon actuation of said second relay means;
   fourth relay means actuated upon actuation of said third relay means after a predetermined time delay, said delayed actuation deactuating said third relay means after a second predetermined time delay; and
   stepping relay means connected for step actuation in response to each of said plural successive actuating outputs to disable said first relay means after a preset number of step actuations.

12. A control system as set forth in claim 11 which is further characterized to include:
   selector switch means for applying a disable input to said stepping relay means for output to disable said first relay means after said preset number of step actuations.

13. A control system as set forth in claim 12 wherein said selector switch means comprises:
   rotary switch means having wiper and plural contacts with a disable voltage applied to the wiper; and
   plural conductors each connected between one of said rotary switch means plural contacts and a respective step position of said stepping relay means.

14. A control system as set forth in claim 11 which is further characterized to include:
   counter means actuated through one count in response to disabling of said first relay means after said preset actuations.

15. A control system as set forth in claim 8 which is further characterized to include:
   counter means actuated simultaneously with said third switch means to register one count.

References Cited

UNITED STATES PATENTS

| | | | |
|---|---|---|---|
| 3,080,035 | 3/1963 | Diaz | 194—4 |
| 3,273,914 | 9/1966 | Wagner | 194—10 |

STANLEY H. TOLLBERG, Primary Examiner